United States Patent
Evans et al.

(10) Patent No.: US 10,458,829 B2
(45) Date of Patent: *Oct. 29, 2019

(54) NON-INVASIVE FLUID FLOW DETECTION USING DIGITAL ACCELEROMETERS

(71) Applicant: Jabil Inc., St. Petersburg, FL (US)

(72) Inventors: Jamie Evans, St. Petersburg, FL (US); Stephen McSorley, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/793,745

(22) Filed: Oct. 25, 2017

(65) Prior Publication Data

US 2018/0106652 A1   Apr. 19, 2018

Related U.S. Application Data

(63) Continuation of application No. 14/951,068, filed on Nov. 24, 2015, now Pat. No. 9,927,274.

(60) Provisional application No. 62/083,765, filed on Nov. 24, 2014.

(51) Int. Cl.
| | | |
|---|---|---|
| G01F 3/00 | (2006.01) | |
| F04B 43/08 | (2006.01) | |
| F04B 43/12 | (2006.01) | |
| F04B 49/06 | (2006.01) | |
| G01P 15/125 | (2006.01) | |
| G01P 5/02 | (2006.01) | |
| G01F 3/20 | (2006.01) | |

(52) U.S. Cl.
CPC ............... *G01F 3/00* (2013.01); *F04B 43/08* (2013.01); *F04B 43/12* (2013.01); *F04B 49/065* (2013.01); *F04B 2205/12* (2013.01); *G01F 3/20* (2013.01); *G01P 5/02* (2013.01); *G01P 15/125* (2013.01)

(58) Field of Classification Search
CPC ...................................... G01F 3/00; G01P 7/00
See application file for complete search history.

(56) References Cited

U.S. PATENT DOCUMENTS

| | | | | |
|---|---|---|---|---|
| 4,002,077 | A * | 1/1977 | Taplin | G01P 7/00 |
| | | | | 73/503 |
| 6,412,352 | B1 * | 7/2002 | Evans | G01F 1/666 |
| | | | | 73/592 |
| 9,310,234 | B2 * | 4/2016 | Huang | G01F 25/0007 |
| 9,328,605 | B2 * | 5/2016 | Conn | E21B 47/18 |
| 9,927,274 | B2 * | 3/2018 | Evans | F04B 43/12 |
| 2012/0268074 | A1 * | 10/2012 | Cooley | H01G 11/58 |
| | | | | 320/130 |
| 2014/0060161 | A1 * | 3/2014 | Schick | G01N 37/00 |
| | | | | 73/53.01 |
| 2014/0165731 | A1 * | 6/2014 | Linford | G01M 3/243 |
| | | | | 73/592 |

\* cited by examiner

*Primary Examiner* — Jewel V Dowtin
(74) *Attorney, Agent, or Firm* — Thomas J. McWilliams; Barnes & Thornburg LLP

(57) ABSTRACT

A system for estimating fluid flow in a system including a pump and a fluid vessel operatively coupled to the pump via a conduit is described herein. The system comprises an accelerometer affixed to an exterior surface of the conduit, wherein the accelerometer is configured to generate signals representing physical movement of the conduit, and wherein the signals are suitable for estimating fluid flow in the conduit.

4 Claims, 4 Drawing Sheets

NON-INVASIVE FLUID FLOW DETECTION USING DIGITAL ACCELEROMETERS

RELATED APPLICATIONS

This application is a continuation application of application Ser. No. 14/951,068, entitled "NON-INVASIVE FLUID FLOW DETECTION USING DIGITAL ACCELEROMETERS", filed on Nov. 24, 2015, which claims priority to U.S. Provisional Application No. 62/083,765, entitled "NON-INVASIVE FLUID FLOW DETECTION USING DIGITAL ACCELEROMETERS", filed Nov. 24, 2014, the contents of which is incorporated by reference in its entirety herein.

BACKGROUND OF THE DISCLOSURE

Field of the Disclosure

The present disclosure is directed to fluid flow detection. More specifically, certain embodiments of the present disclosure relate to the detection of fluid flowing in conduits, vessels or other physical mediums, utilizing accelerometers.

Description of the Background

Fluid flow sensing is an important aspect of many industrial, medical and commercial systems, and is often accomplished using one or more flow sensors. A flow sensor is a device for sensing the rate of fluid flow. Typically a flow sensor is referenced as the sensing element used in a flow meter, or flow logger, to record the flow of fluids. There are various kinds of flow sensors and flow meters, including some that have a vane that is pushed by the fluid and that can drive a rotary potentiometer or similar device. Other flow sensors are based on sensors which measure the transfer of heat caused by the moving medium. This principle is common for microsensors to measure flow.

Flow meters are related to devices called velocimeters that measure velocity of fluids flowing through them. Another example of flow measurement is the laser-based interferometry often used for air flow measurement; but for liquids, it is often easier to simply measure the flow. Another approach to flow measurement is Doppler-based methods. Hall effect sensors may also be used, such as on a flapper valve, or vane, to sense the position of the vane as displaced by fluid flow. Other examples of flow sensors include Doppler (ultrasonic) sensors, sensors based on the Coriolis Effect, thermal mass flow sensors, Venturi meters and vortex flow meters, among others.

While such configurations are accurate for sensing fluid flow, they are expensive and often require invasive sensors that complicate the installation process for the sensor itself into the system in which flow is to be measured. What is needed is a non-invasive sensing configuration that is inexpensive yet sufficiently accurate to measure fluid flow.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
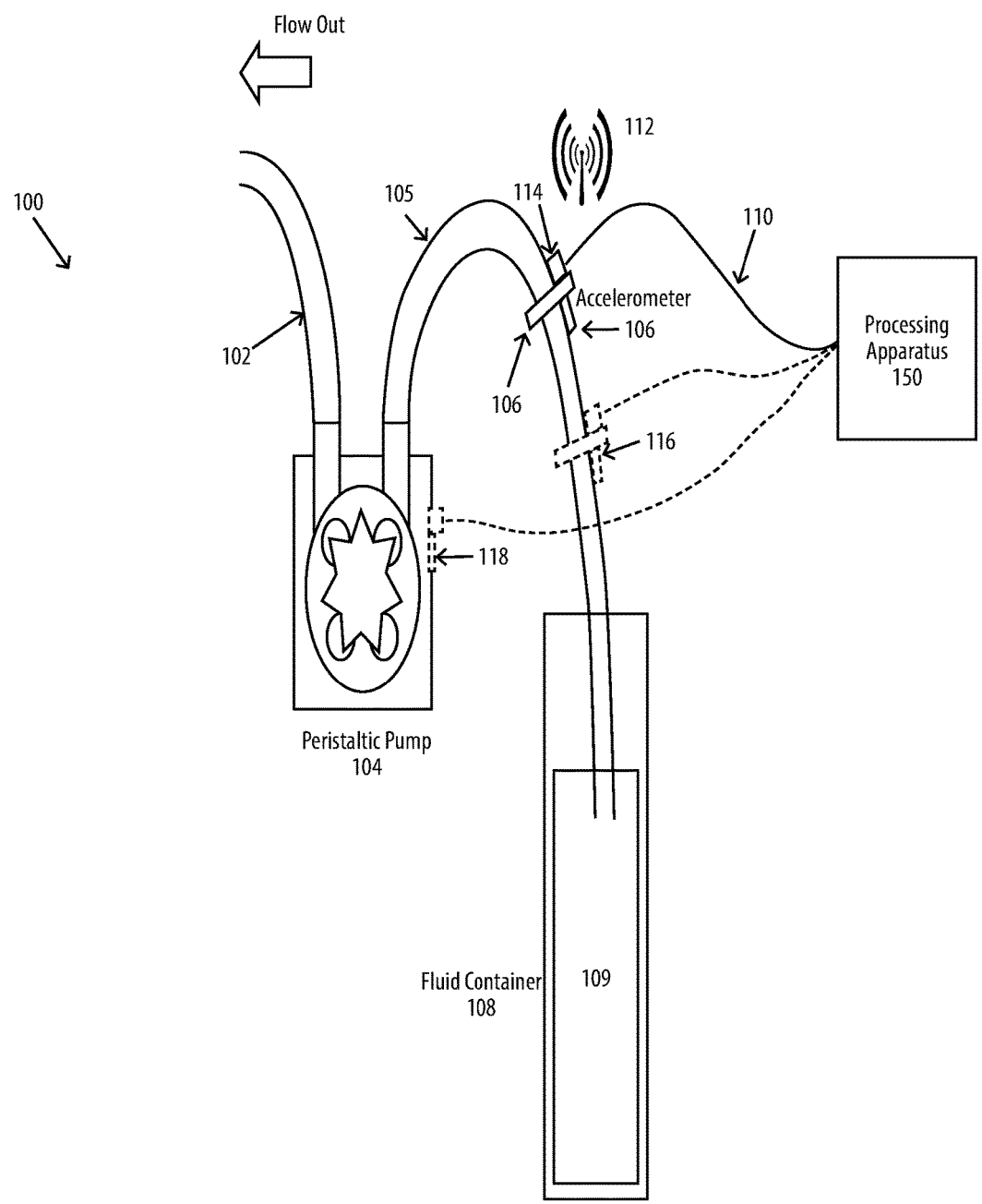
FIG. 1 illustrates an exemplary fluid detection system comprising a container, pump, accelerometer and processor under one exemplary embodiment.

Exemplary embodiments will now be described more fully with reference to the accompanying drawings.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Various embodiments will be described herein below with reference to the accompanying drawings. In the following description, well-known functions or constructions are not described in detail since they may obscure the invention in unnecessary detail.

Turning now to FIG. 1, illustrated is a system 100 in which a fluid container 108 containing fluid 109 is fluidly coupled to pump 104 via tube 105. In one exemplary embodiment, pump 104 may be a peristaltic pump coupled to container 108 via flexible tubing 105, which may be manufactured from a suitable rubber, plastic or polymer such as polyvinyl chloride, silicone rubber, fluoropolymer, PharMed and the like. In another embodiment, tubing 105 may comprise a rigid or semi-rigid material. Peristaltic pump 104 may be configured as a positive displacement pump used for pumping a variety of fluids through output tubing 102. The fluid is contained within tube 105, as may be fitted inside a circular pump casing (or linear peristaltic pump, as the case may be). Typically, a rotor with a number of rollers (or "shoes", "wipers", or "lobes") attached to the external circumference of the rotor compresses flexible tube 105 to provide fluid flow. As the rotor turns, the part of the tube under compression is pinched closed (or "occludes") thus forcing the fluid to be pumped and thus move through the tube. Additionally, as the tube opens to its natural state after the passing of the cam ("restitution" or "resilience"), fluid flow is induced to the pump.

In an embodiment, pump 104 may comprise two or more rollers, or wipers, occluding the tube and thereby trapping between them a body of fluid. The body of fluid is then transported, at ambient pressure, toward the pump outlet 102. Pump 104 may be configured to run continuously, or may be indexed through partial revolutions to deliver smaller amounts of fluid. While a peristaltic pump is disclosed herein, it should be understood by those skilled in the art that other types of pumps are contemplated in the present disclosure, including reciprocating pumps, rotary pumps, and the like.

In the exemplary embodiment of FIG. 1, accelerometer 106 is coupled to an outer portion of tube 105 via fastener 106, which may comprise a clamp, tie, band, all by way of a non-limiting example. In one embodiment, accelerometer 106 is coupled via communication circuit 112 and wire 110 to a processing apparatus 150, such as a controller, microcontroller or computing device, all by way of non-limiting example. Communication circuit may 114 be configured to provide communications in any suitable wired communication protocol, including, but not limited to, RS-232, SMBus, I2C, USB, IEEE-1394 and the like. In another embodiment, communication circuit 114 of accelerometer 106 may be embodied as a wireless communication circuit, which communicatively couples accelerometer 106, using wireless communication 112, with processing apparatus 150 via any suitable wireless protocol including, but not limited to, WiFi, Bluetooth, or any other suitable wireless protocol known in the art.

In certain embodiments, the example of FIG. 1 includes a single accelerometer assembly, comprising accelerometer 106, communications 114, and a mechanism 106 for attaching them to a flow surface. In other exemplary embodiments, system 100 may include a plurality of accelerometer assemblies distributed along the same conduit. For example, a second accelerometer assembly 116 may be provided on a second point of a flow surface for tubing 105. Utilizing a plurality of accelerometer assemblies may be advantageous in that the secondary accelerometer readings may provide useful data for improving the accuracy of the overall flow sensing, and/or provide additional accelerometer data points in which specific flow characteristics may be determined. For example, secondary accelerometer readings may be used to confirm data produced by a first accelerometer and/or confirm flow direction. As the accelerometer assemblies may be placed a certain distance apart, the time differences between each reading may be used to detect flow direction and/or other characteristics of the flow in the tubing such as blockage, leaking, bubble detection and obstruction for example.

In certain exemplary embodiments, system 100 of FIG. 1 may also include accelerometer assemblies affixed to the pumping mechanisms themselves. As can be seen from FIG. 1, accelerometer assembly 118 may be affixed to pump 104 on a pump casing using any suitable fastening mechanism, including, but not limited to, an adhesive, bonding agent, screw, rivet, nail, or any combinations thereof. Accelerometer assembly 118 may also be integrated into pump 104 itself, or also affixed between a pump casing and tube 105.

Figure 2:
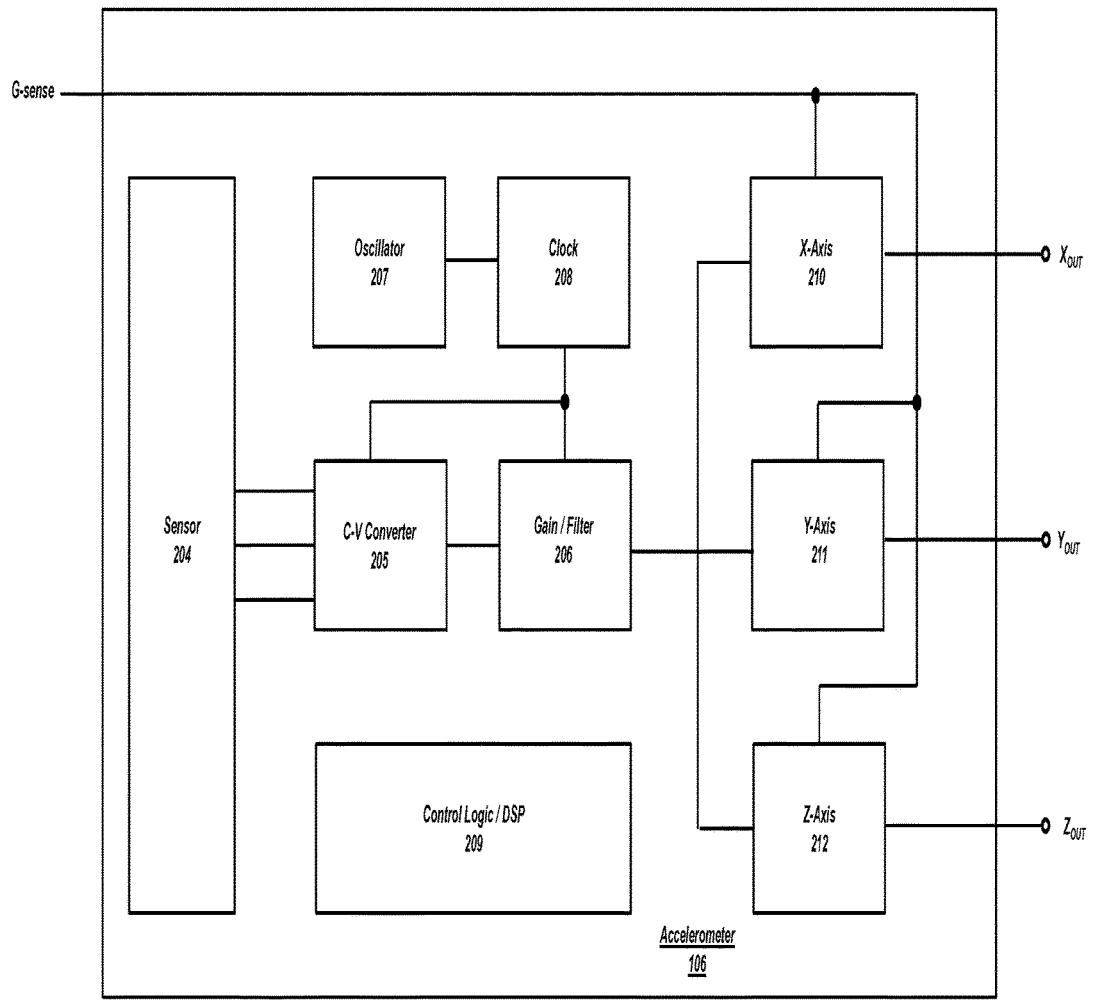
FIG. 2 illustrates an exemplary accelerometer suitable for use in the embodiment of FIG. 1.

Turning now also to FIG. 2, an exemplary simplified block diagram of accelerometer 106 is illustrated. In this example, the accelerometer is embodied as a three-dimensional accelerometer, although it is understood by those skilled in the art that other types of accelerometers may be utilized. Sensor 204 may be embodied as a capacitive sensor, although other components (e.g., piezoelectric, piezoresistive) may be modified or substituted for specific applications. The accelerometer may be, for example, digital, such as to allow for the accelerometer to more readily interface with additional digital systems.

In certain embodiments, sensor 204 may comprise a plurality of surface micromachined capacitive sensing cells and a signal conditioning ASIC packaged in a single integrated circuit. The sensing cell may be embodied as a mechanical structure formed from semiconductor materials, such as polysilicon, using semiconductor processes (e.g., masking and etching). In certain embodiments, it may be modeled as a set of beams attached to a movable central mass that moves between fixed beams. The movable beams can be deflected from their respective rest positions by subjecting the system to an acceleration.

In certain embodiments, as the beams attached to the central mass in sensor 204 move, the distance from them to the fixed beams on one side will increase by the same amount that the distance to the fixed beams on the other side decreases. This change in distance may be used to measure acceleration. The cell beams may be formed as two back-to-back capacitors for example. Thus, as the center beam moves with acceleration, the distance between the beams changes and each capacitor's value will change, i.e., ($C=A\varepsilon/D$), where A is the area of the beam, $\varepsilon$ is the dielectric constant, and D is the distance between the beams.

In certain embodiments, a capacitance-to-voltage converter 205 may include an ASIC implementing switched capacitor techniques to measure g-cell capacitance and extract acceleration data based upon the difference between capacitors. The ASIC may also condition and filter the signals 206 via switched capacitors, providing high level output voltages to X, Y and Z-axis modules 210-212 that are ratiometric and proportional to acceleration. Ratiometricity refers to the output offset voltage and sensitivity that may scale linearly with applied supply voltage. That is, as supply voltage is increased, the sensitivity and offset increase linearly; and as supply voltage decreases, and offset and sensitivity decrease linearly. This feature is advantageous when interfacing to a microcontroller (150) or an A/D converter because it provides system level cancellation of supply induced errors in the analog to digital conversion process. The timing of accelerometer 106 may be provided by clock 208, which operates using oscillator 207. Additional accelerometer signal processing may be provided by control logic/DSP 209 to modify parameters for accelerometer signal readings including, but not limited to, configuring buffers, adjusting motion detection and transient detection, enhancing orientation, hysteresis, configuring Z-lockout and the like.

Depending on the application, the accelerometer's sensitivity (g-sense) may be adjusted, for example, via logic switches, independent of, or in conjunction with control logic/DSP 209 to allow for a plurality of sensitivities. Depending on the logic input placed on the pins, the internal gain may be changed allowing it to function with a plurality of sensitivities (e.g., 1.5 g, 2 g, 4 g, or 6 g). This feature is advantageous when applications require different sensitivities for optimum performance (e.g., applying accelerometer (s) to a fluid bag vs. tubing). The sensitivity may be configured such that it may be changed at any time during the operation.

By affixing accelerometer 106 to tubing 105, based on fluid that is moved through the tubing by a peristaltic pump (104), vibration pump, or any pump without a steady flow, a signal can be detected proportional to the pulse of the fluid created by the pumping action. In one embodiment, the Z-axis of the sensor may be arranged against the tubing, with the tubing slightly compressed. Pump 104 may also create vibration along the tube from its operation. Since liquids resist being compressed, the resulting pulse may cause the tube to expand slightly as the pressure wave moves along its length. The expansion should be significantly greater than any vibration conducted in the tube material alone. By sensing the motion of the expansion/contraction of the pulse from the accelerometer, the detection of fluid flow may be realized.

Figure 3:
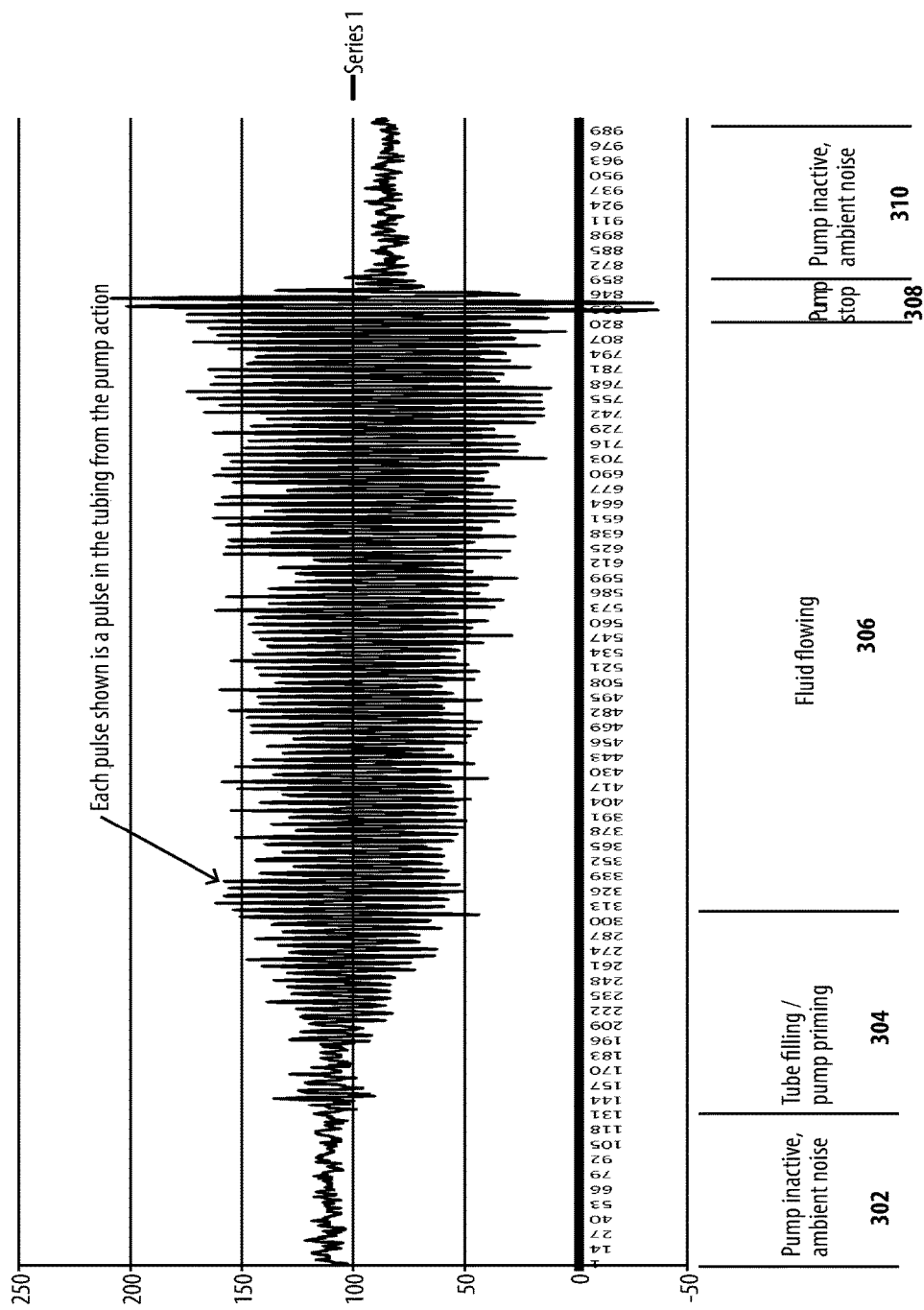
FIG. 3 is an exemplary signal diagram illustrating the accelerometer detections of fluid flow of empty tube to full under one embodiment.

The accelerometer data may be processed to produce a waveform representing the fluid flow, where the difference in the signal between the fluid flowing and no flow or empty tubing is measured and processed by a processing apparatus (150). With reference now to FIG. 3, an exemplary waveform is provided, illustrating an empty tube to full tube operation phase (i.e., when fluid is being introduced into the tube). As can be seen in the figure, each pulse is shown as a pulse in the tubing from the pump action. In stage 302, an exemplary pump is inactive, where only ambient noise is measured. In certain embodiments, ambient noise may be filtered or minimized using accelerometer sensitivity adjustment. In stage 304, the tube is filling during a pump priming process, and the accelerometer readings increase.

In stage 306, fluid is now flowing and each individual pump is detected. This process continued until stage 308, upon which the pump is stopped and eventually rendered inactive in stage 310. In certain embodiments, fluid flow may be estimated using processing apparatus 150. Accelerometer pulses may be filtered and/or normalized to induce pulse peaks to be more uniform, and may be subjected to a pulse count for pulses meeting or exceeding a given threshold. By knowing in advance the volumetric pumping characteristics of the pump and volumetric capacity of the tubing, a flow rate may be advantageously estimated/calculated. In the case of a peristaltic pump, each detected pulse may represent the dosed amount of fluid between each roller in the pump. In the case of a vibration pump, each detected pulse may represent the thrusting action of the pump. Using this known dose amount may then be used in a calculation to determine the amount of fluid flowing.

Figure 4:
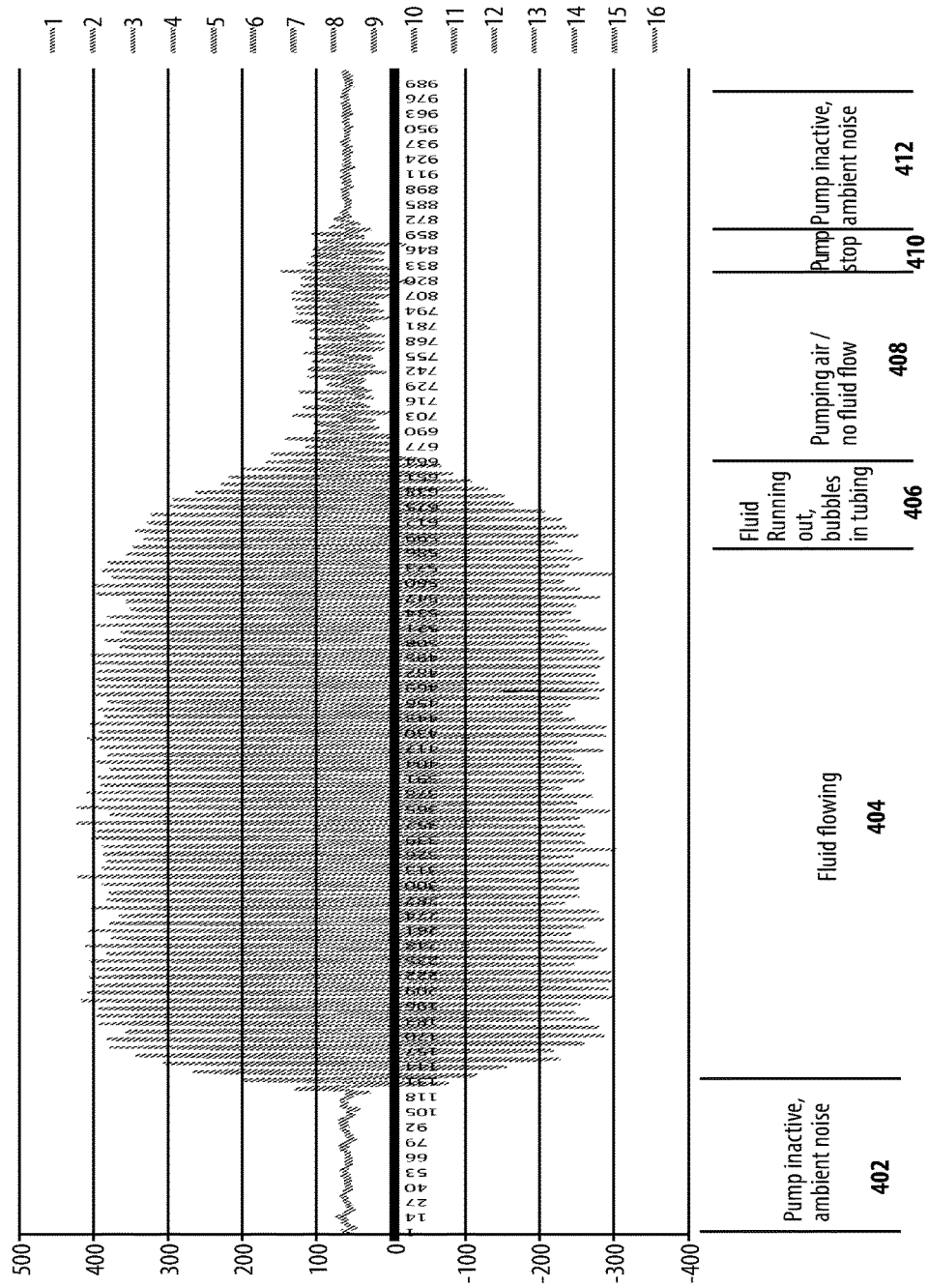
FIG. 4 is an exemplary signal diagram illustrating the accelerometer detections of fluid flow of full tube to empty under one embodiment.

Turning to FIG. 4, an exemplary waveform is provided, illustrating a full tube to empty tube operation phase (i.e., when fluid begins to empty from the tube). After being inactive in stage 402, fluid begins to flow in stage 404 and accelerometer pulses may be detected. In stage 406, fluid begins to run out and bubbles may form in the tubing, resulting in successively smaller pulse amplitudes. In stage 408, fluid flow is minimal or nonexistent, and the tube is substantially pumping only air. In stage 410, the pump is stopped and the system is thus rendered inactive in stage 412.

Similar to the embodiment in FIG. 3, accelerometer pulses may be filtered and/or normalized. However, due to the amplitude minimization of stage 406, it may be desirable to employ a plurality of thresholds in processing the pulses to estimate fluid flow. In one example, five thresholds may be engaged in processing device 150 to represent 20% reduction in fluid flow. Thus, pulses measured at a full threshold would represent a 100% fluid flow, and pulses measured at the next threshold would represent an 80% fluid flow. Accordingly, the predetermined volumetric flow discussed above would be weighted by multiplying the predetermined value by 80%. The next threshold would represent a 60% fluid flow weight, followed by a 40% fluid flow weight, and so on. By employing multiple weights, a more accurate flow reading may be obtained.

Of course, one skilled in the art would understand that any suitable number of thresholds may be utilized, depending on the accuracy needs of the application. Furthermore, negative thresholds may be used to detect the positive and negative phases of the accelerometer pulse signal. Moreover, additional signal processing techniques may be used, such as zero-crossing detection, to further increase accuracy.

The skilled artisan may recognize, in light of the discussion herein, that aspects of the instant disclosure may be employed in any system requiring fluid flow detection such as, but not limited to, medical systems such as those employed in hemodialysis, beverage dispensing fountains, and the like. When so-employed, the disclosed systems may be provided at lower cost and less invasively and intrusively than known systems. For example, proportional detection of fluid flow principally from a position external to the flow conduit negates the need to insert the detector into the fluid flow, and accordingly decreases the intrusiveness and increases the cost-effectiveness of detection; and the placement of a detector principally external to the conduit modifies the requirements for the detector's specifications, thus further lowering costs.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for estimating fluid flow in a system including a pump and a fluid vessel operatively coupled to the pump via a conduit, comprising:

an accelerometer affixed to an exterior surface of the conduit, wherein the accelerometer is configured to generate signals indicative of vibrations imparted to the conduit solely by the pump; and an inferential engine comprising code executed by at least one processor and capable of relationally inferring fluid characteristics of the fluid flow in the conduit from the generated signals indicative of vibrations of the conduit.

2. The system of claim 1, wherein the processing device is configured to one of filter and normalize the accelerometer signals.

3. The system of claim 1, wherein the processing device is configured to determine if a portion of the signals meets at least one predetermined threshold.

4. The system of claim 3, wherein the processing device is configured to count pulses in the portion of the signals meeting the at least one predetermined threshold.

* * * * *